(Model.)
M. H. PETERSEN.
HORSESHOE.
No. 349,234.  Patented Sept. 14, 1886.
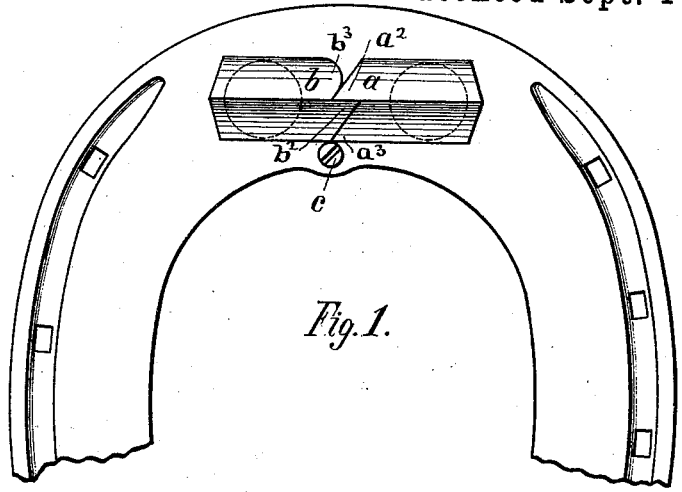
Fig. 1.
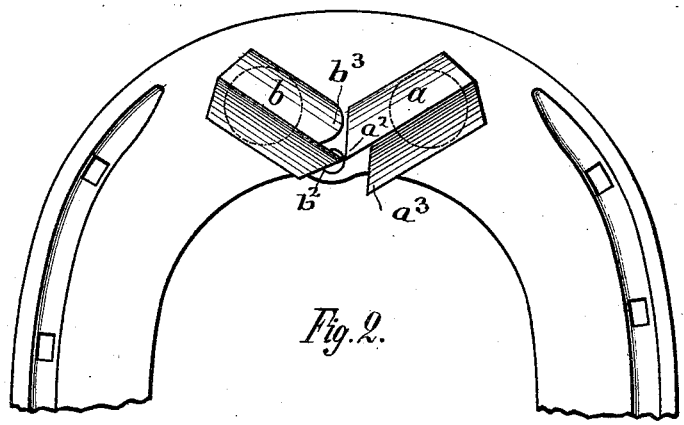
Fig. 2.
Fig. 3.  Fig. 5.  Fig. 4.
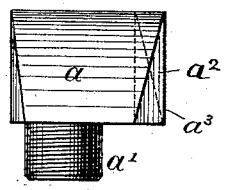 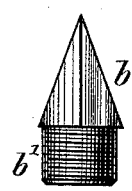 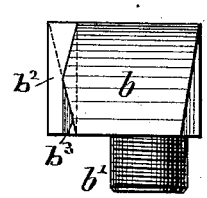
Witnesses:
C. J. Belt.
O. A. Clark.
Inventor:
Marcus Hermann Petersen.
Paine and Ladd
Attys.

UNITED STATES PATENT OFFICE.

MARCUS HERMANN PETERSEN, OF HAMBURG, GERMANY.

HORSESHOE.

SPECIFICATION forming part of Letters Patent No. 349,234, dated September 14, 1886.

Application filed June 10, 1886. Serial No. 204,710. (Model.)

*To all whom it may concern:*

Be it known that I, MARCUS HERMANN PETERSEN, a subject of the German Emperor, and a resident of Hamburg, in the German Empire, have invented certain new and useful Improvements in Horseshoes, of which the following is a specification.

My invention relates to improvements in horseshoes provided with detachable calks; and the object of my improvement is to provide an easily-removable calk which cannot work out of place. I attain this object by the device illustrated in the accompanying drawings, in which—

Figure 1 is a bottom view of a part of a horseshoe provided with my detachable bipartite calk, the latter being shown in the fastened position. Fig. 2 is the same view as above, but showing the manner of detaching the two halves of the calk. Figs. 3 and 4 are back elevations of the two halves of the detachable calk, and Fig. 5 is a side elevation of one of the halves.

Similar letters refer to similar parts throughout the several views.

$a$ and $b$ are the two halves of the calk. They are provided each with a threaded projection, $a'$ $b'$, respectively. One of the threads of the projections should be a right-handed one and the other one a left-handed, Figs. 3 and 4. These projections fit into suitably-threaded holes of the horseshoe. The adjacent faces of the two parts of the calk are made with interlocking saw-tooth projections $a^2$ and $b^2$, disposed, as shown, so that the tooth of one part shuts into the angular recess of the other when the two parts are swung together. On the part $b$ the corner $b^3$ is rounded to permit the halves of the calk being swung into line with each other; but the angular corner $a^3$ on the part $a$ prevents the parts from being turned past the straight position shown by Fig. 1. If the screw-threads $a'$ and $b'$, or either of them, are not turned so as to bring the screws exactly home when the two halves of the calk are in line with each other, the calk would work loose but for the interlocking feature of the contact-faces, which prevents either part from passing by the other. When both halves are screwed in and placed in such a manner as to touch each other by their zigzag surfaces, a screw, $c$, is screwed into the horseshoe behind the contact line of the two halves. The projecting head of such screw $c$ will prevent the two halves from unscrewing, Fig. 1. The corner $a^3$ of the interlocking faces prevents the calks from overscrewing past one another, as they would do unless the right and left hand screw-threads on their shanks should end just so as to allow the projecting parts of the calks to bed themselves on the surface of the shoe when the calks are brought into line, or unless the ends of the screw-threads on the shanks should jam themselves against the screw-threads in the holes of the shoe when the calks are brought into line, as aforesaid. According to the present invention, the calks will be interlocked irrespective of the screw-threads, and it is not necessary that the shanks should be screwed into the holes for their full length.

In Fig. 3, $a'$ is the screw-threaded shank; $a^2$, the sharp corner on the center line of the calk. The corner $a^3$ comes behind the corner $a^2$, and is indicated by the sloping dotted line, the depth of the tooth being indicated by the vertical dotted line.

In Fig. 4, $b'$ is the screw-threaded shank; $b^2$, the projecting tooth, which comes between the corners $a^2$ and $a^3$ when the calks are brought into line. The rounded corner $b^3$ is shown by the full lines in front of the tooth $b^2$, the vertical dotted line indicating the depth of the tooth $a^2$. The sloping lines, which are not lettered, appear because the ends of the calks opposite the zigzag faces are chamfered, and the sides of the calks are inclined, as shown in Fig. 5.

Having now particularly described and ascertained the nature of my said invention and in what manner the same is to be performed, I declare that what I claim is—

1. The combination, with a horseshoe, of a calk formed of two parts and provided with the reversely screw-threaded shanks, the interlocking faces $a^2$ and $b^2$, the angular corner $a^3$, and the rounded corner $b^3$, and a locking device which prevents the parts of the calk from turning backward when interlocked.

2. As an article of manufacture, a horse-shoe-calk formed of two parts and provided with the reversely screw-threaded shanks, the interlocking faces $a^2$ and $b^2$, the angular corner $a^3$, and the rounded corner $b^3$.

In testimony that I claim the foregoing as my invention I have signed my name, in presence of two witnesses, this 22d day of May, 1886.

MARCUS HERMANN PETERSEN.

Witnesses:
ALEXANDER SPECHT,
EMIL HAASE.